Nov. 18, 1941.  A. SHERWOOD  2,262,780
INNER TIRE
Filed Oct. 31, 1939
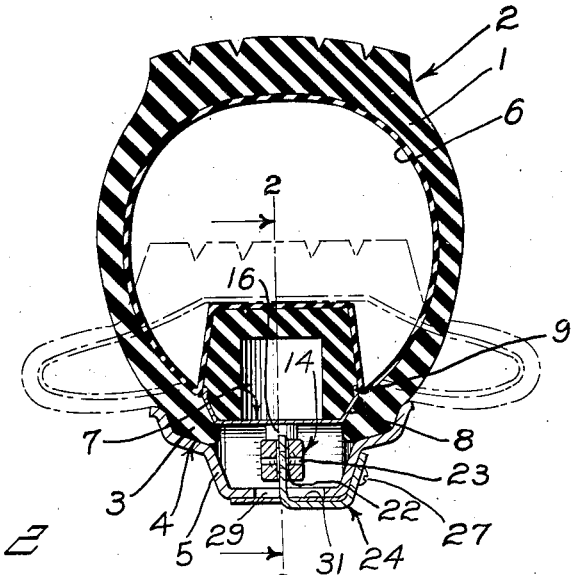
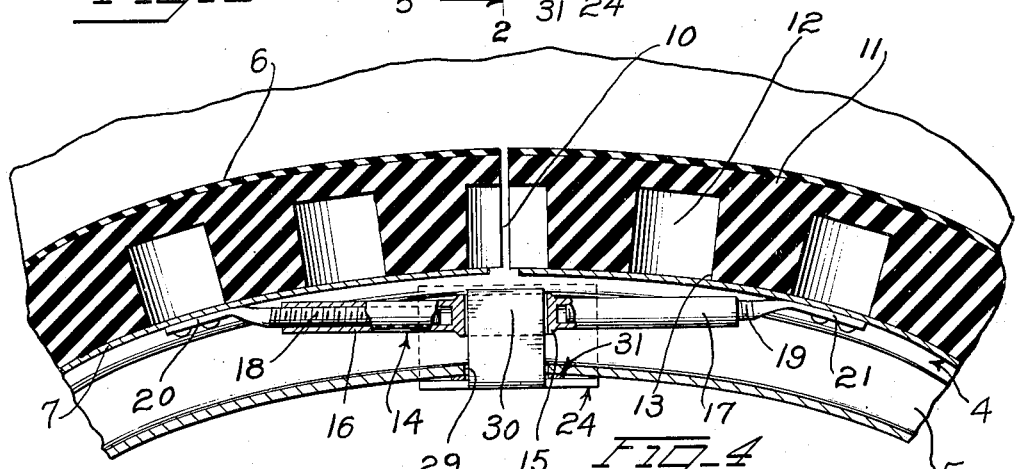
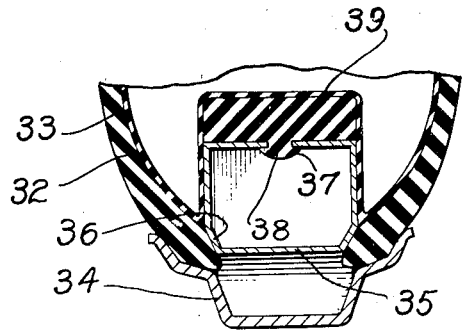
Inventor
A. Sherwood.
By Lacey & Lacey,
Attorneys Patented Nov. 18, 1941

2,262,780

UNITED STATES PATENT OFFICE 2,262,780

INNER TIRE

Arthur Sherwood, Greenwich, Conn.

Application October 31, 1939, Serial No. 302,233

5 Claims. (Cl. 152—158)

This invention relates to an improved inner tire and seeks among other objects to provide a device of this character which is intended to be mounted within a conventional pneumatic vehicle tire and which will protect said tire against injury in the event of a blow-out or puncture.

Another object of the invention is to provide an inner tire which will protect the pneumatic tire when the vehicle is caused to come in contact with a curbstone or the like.

As a further object, the invention provides a tire of this nature which will be effective for preventing rim cuts due to contact of the rim with the inner tube of the pneumatic tire and which will at the same time provide cushioning for the vehicle.

Another object of the invention is to provide an inner tire which will effectively prevent accidental displacement of the vehicle tire from the wheel upon deflation of said tire when the vehicle is in motion.

As a further object, the invention provides a device which will eliminate the necessity of stopping the motor vehicle, for the purpose of changing a deflated pneumatic tire, in the darkness, rain, snow, slush or mud or on a lonesome road.

As another object, the invention provides an inner tire, the use of which will preclude the necessity of carrying a spare tire.

As a still further object, the invention seeks to provide an inner tire employing locking means which will effectively prevent displacement of the inner tire with respect to the rim of the conventional pneumatic tire.

Further objects of the invention, not mentioned hereinbefore, will become apparent during the course of the following description.

In the drawing:

Figure 1 is a vertical sectional view showing my improved inner tire as it would appear installed within a conventional pneumatic tire, Figure 2 is an enlarged detail sectional view on the line 2—2 of Figure 1 looking in the direction indicated by the arrows and showing particularly the turnbuckle and inner tire structure, Figure 3 is a fragmentary vertical sectional view showing a slight modification, and Figure 4 is a perspective view, on an enlarged scale, showing the locking plate employed.

Referring now more particularly to the accompanying drawing wherein like numerals of reference will be seen to designate like parts, the numeral 1 indicates in general the casing of a tire 2 which tire may be of any desired construction. The casing 1 is provided with beads 3 which are engageable against shoulders 4 of a conventional drop-center rim 5. Mounted within the casing 1 and normally inflated against the iner surfaces of said casing is an inner tube 6, also of conventional construction, with the exception that, for reasons to be explained hereinafter, an extended valve stem will be employed.

The inner tire comprising the subject-matter of my invention includes a preferably sheet metal inner rim 7 which is formed with upwardly inclined flanges 8 which terminate at their corresponding upper ends in gripping edges 9. The rim extends throughout substantially the entire circumference of the interior of the tire 1, and, as best seen in Figure 1, the rim is disposed normally with the flanges 8 in engagement with the inner inclined surfaces of the beads 3. As shown at 10 in Figure 2, the rim is split so that it may be expanded and contracted for permitting adjustment or removal. The rim 7 carries a split rubber inner tire body 11 which extends throughout the entire circumference of said rim and is gripped by the portions 9 so as to be firmly secured on said inner rim. The inner tire body 11 is formed of semi-hard rubber so as to insure durability and long wear, and at the same time provide a cushioning effect. Formed in the inner tire body and spaced about the circumference thereof are cushioning pockets 12, said cushioning pockets having open ends 13 which communicate with the outer surface of the rim 7. The pockets 12 will, of course, contribute a great deal to the cushioning action of the inner tire comprising the subject-matter of my invention.

In order to adjust the inner rim 7 within the casing 1, there is provided a turn-buckle which is shown generally at 14. The turn-buckle 14 includes a body portion 15, which body portion has integrally connected therewith oppositely extending alined internally threaded sleeves 16 and 17. The sleeves 16 and 17 receive threaded shanks 18 and 19, which shanks are flattened at their outer ends to define anchoring plates 20 and 21. The anchoring plates 20 and 21 are riveted or otherwise secured to the under surface of the inner rim 7.

As clearly shown in Figure 1, at 22, the body 15 of the turn-buckle 14 is formed with a rectangular slot, said slot extending throughout the thickness of said body portion. The body portion 15, as shown in Figure 1, is rectangular in shape. It should be understood that, if desired, the body portion may be hexagonal or of any other desired shape.

It will now be understood that, after the inner tire has been mounted within the casing 1, and it is desired to tighten the rim 7, it is only necessary to engage the end of a flat wrench into the slot 22 for moving the body portion as much as is necessary for rotating the turn-buckle and spreading the inner rim 7. As shown at 23, the body portion is provided with a slot disposed at right angles to the slot 22 so that it will be possible to engage said turn-buckle with the wrench with the utmost facility. After the turn-buckle has been adjusted, and it is desired to lock the said turn-buckle in its adjusted position, I install a locking plate which is shown clearly in Figure 4 of the drawing at 24. The locking plate 24 includes a mounting portion 25 which is formed with a pair of openings 26 which receive screws 27 for fastening the said locking plate to the rim 5. The locking plate includes a flat portion 28 which is adapted partially to underlie an opening 29 in the rim 5. Formed integrally on the portion 28 of the plate 24 and extending at right angles to said portion 23 and into the slot 22 is a locking tongue 30, said locking tongue being of reduced width with respect to the plate. It will now be seen that by installing the locking plate to the position shown in Figure 1, the turn-buckle 14 will be prevented from changing its adjustment.

A cover plate 31 is mounted beneath the opening 29 and is slotted to receive the tongue 30, said plate 31 being clamped between the portion 28 and the margins of the openings 29. The plate 31 will, of course, prevent entry of dirt through said opening 29.

Attention is directed to the fact that the inner tire body 11 will be of sufficient height so that, in the event the tube 6 becomes punctured and deflated, the side walls of the tire will not be broken or otherwise injured.

Referring now to the modification of my invention as shown in Figure 3 of the drawing, the numeral 32 indicates the tire casing which is of identical construction to the casing 1. A tube 33 is mounted in the casing and is, of course, of conventional construction. A drop-center rim 34 mounts the tire casing 32.

Mounted within the casing and extending circumferentially thereabout is a preferably sheet metal inner tire body 35, said body having beveled portions 36 which are engageable with the inner surfaces of the beads of the tire 32. The inner tire body 35 is preferably substantially rectangular in cross section and is formed of stiff light weight sheet metal.

Mounted on the outer surface of the inner tire body, by means of a circular bead 37, which engages through an opening 38 in said body 35, is a semi-resilient preferably rubber tire portion 39. The tire portion 39 will serve the same purpose as the inner tire body 11.

Aside from the construction of the inner tire body, which in the modified form, is of metal, the modification functions in an identical manner with the preferred form.

As stated heretofore, it will be necessary to employ a somewhat longer valve stem for the conventional inner tube for the reason that said valve stem will be required to pass through the inner tire body and rim and also through the rim 5.

It is desired particularly to call attention to the fact that my improved inner tire will, when installed, engage the inner surface of the bead of the vehicle tire and effectively prevent said tire from flying off the wheel when the tire becomes deflated when the vehicle is in motion.

It is also desired to state that the inner tire body can be constructed of rubber, steel, wood, compressed cotton, or plastic materials.

The use of my improved inner tire precludes the necessity of carrying a spare tire and, in the event of a blow-out or puncture, my improved inner tire acts to protect the driver against accidents which would ordinarily be caused by sudden deflation of an ordinary tire. The device also acts to protect the tire inasmuch as the side walls of said tire are prevented from being completely collapsed or buckled. In addition, my inner tire will have cushioning effect so that a fair measure of riding comfort will be maintained even though the pneumatic tire has become deflated.

Having thus described the invention, what is claimed as new is:

1. In a device of the class described, in combination with a tire casing, a rim mounting the tire casing, a metal inner tire body carried within the casing and having an opening, and a tire casing carried by the metal inner tire body and having a stud engageable in the opening.

2. In a device of the class decribed, a split inner rim, an inner tire body carried by said inner rim, a turn-buckle including a body portion and sleeve, said turn-buckle having shanks connected with the rim and said turn-buckle being movable for adjusting the inner tire within a tire casing, and a locking plate engageable with the turn-buckle for limiting said turn-buckle against accidental rotative movement.

3. In a device of the class described as recited in claim 2, wherein the locking plate includes a portion engageable with a tire rim, a flat portion, and a tongue engageable with the turn-buckle.

4. In a device of the class described, in combination with a tire casing, a rim mounting the casing and having an opening, and a tube within the casing, a split inner rim within the casing, an inner tire body carried by the split inner rim, a turn-buckle carried by the split inner rim and having a body portion and sleeve, said turn-buckle having shanks carried by the rim and said turn-buckle being operable for adjusting the inner tire body and inner rim within the tire casing, and a locking plate carried by the first-mentioned rim and having a tongue engageable with the body portion of the turn-buckle for limiting said turn-buckle against accidental displacement, said inner tire preventing complete collapse of the tire casing upon deflation of the tube.

5. In a device of the class described, a metal inner tire body to be carried within a tire casing and having an opening, and a tire casing carried by the metal tire body and having a stud engageable in the opening.

ARTHUR SHERWOOD